(12) United States Patent
Ou et al.

(10) Patent No.: US 8,436,969 B2
(45) Date of Patent: May 7, 2013

(54) PHOTO ALIGNMENT PROCESS AND LIQUID CRYSTAL DISPLAY USING THE SAME

(75) Inventors: Yao-Jen Ou, Miao-Li County (TW); Hang-Lian Lee, Miao-Li County (TW); Jian-Cheng Chen, Miao-Li County (TW); Bo-Chin Tsuei, Miao-Li County (TW)

(73) Assignee: Chimei Innolux Corporation (TW)

( * ) Notice: Subject to any disclaimer, the term of this patent is extended or adjusted under 35 U.S.C. 154(b) by 262 days.

(21) Appl. No.: 13/031,230

(22) Filed: Feb. 20, 2011

(65) Prior Publication Data
US 2012/0086893 A1 Apr. 12, 2012

(30) Foreign Application Priority Data
Oct. 7, 2010 (TW) ................................ 99134243 A

(51) Int. Cl.
*G02F 1/1337* (2006.01)
(52) U.S. Cl.
USPC ............................... 349/124; 349/99; 349/187

(58) Field of Classification Search .................... 349/99, 349/187, 123, 124, 129, 130, 132, 96; 264/436
See application file for complete search history.

(56) References Cited

U.S. PATENT DOCUMENTS
7,847,899 B2 * 12/2010 Tsai .............................. 349/123

* cited by examiner

*Primary Examiner* — Thoi Duong
(74) *Attorney, Agent, or Firm* — Lowe Hauptman Ham & Berner, LLP

(57) ABSTRACT

A photo alignment process and a liquid crystal display using the same are provided. The photo alignment process includes the following steps. A photo alignment material layer is formed on a substrate. The photo alignment material layer is irradiated by a linearly polarized light. A surface of the photo alignment material layer is a first plane. A wave vector of the linearly polarized light is a K vector. A second plane is constructed from a normal vector of the first plane and the K vector. A polarization direction of the linearly polarized light is neither perpendicular nor parallel to the second plane.

39 Claims, 8 Drawing Sheets

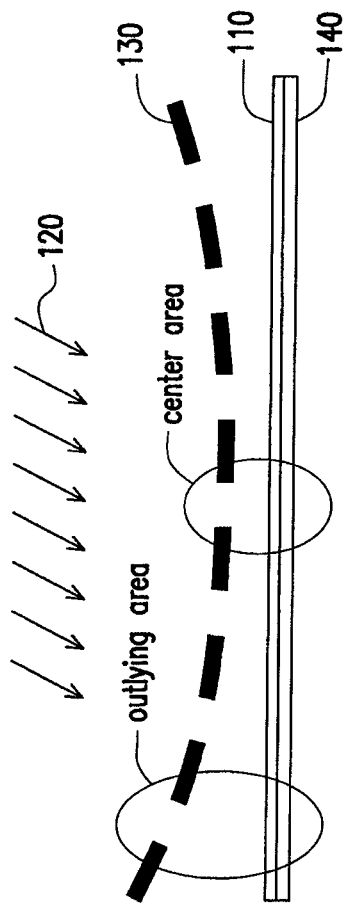
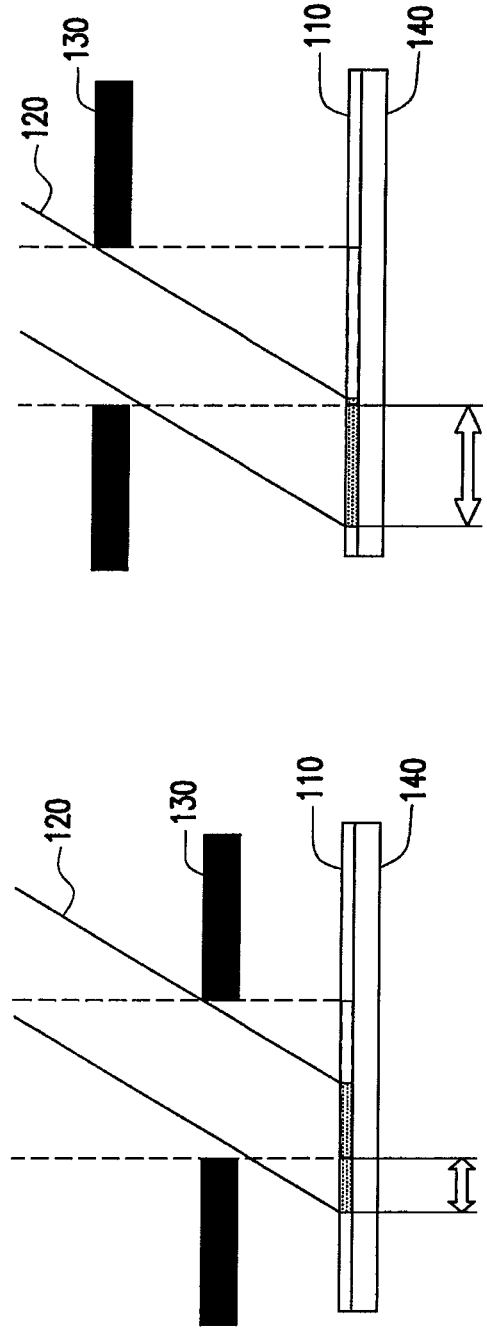
FIG. 1
FIG. 2A (PRIOR ART)
FIG. 2B (PRIOR ART)

PHOTO ALIGNMENT PROCESS AND LIQUID CRYSTAL DISPLAY USING THE SAME

CROSS-REFERENCE TO RELATED APPLICATION

This application claims the priority benefit of Taiwan application serial no. 99134243, filed on Oct. 7, 2010. The entirety of the above-mentioned patent application is hereby incorporated by reference herein and made a part of specification.

BACKGROUND OF THE INVENTION

1. Field of the Invention

The invention relates to an alignment process and a display using the same. More particularly, the invention relates to a photo alignment process and a liquid crystal display using the same.

2. Description of Related Art

In a liquid crystal display, an electric field is applied to a liquid crystal layer through electrodes on two substrates. Liquid crystal molecules in the liquid crystal layer are polarized due to the electric field, such that the liquid crystal layer has a light transmittance corresponding to the electric field for displaying different grayscale images according to the value of the electric field. In order to provide stable boundaries for the liquid crystal molecules to align along a specific direction, an alignment layer is formed on a surface of at least one substrate contacting the liquid crystal layer. For the alignment layer to generate an alignment in a specific direction, conventionally, a rubbing process is performed to the alignment layer with a contact process. However, the alignment layer may be scratched or have particle contamination problem when this contact process is adopted. Consequently, a non-contact alignment process such as a photo alignment process is developed. In the photo alignment process, the alignment layer is irradiated with a linearly polarized light for alignment. A direction of an incident linearly polarized light determines an alignment direction of the alignment layer. An included angle of the incident linear polarized light and the alignment layer affects a pre-tilted angle when the liquid crystal molecules are aligned subsequently.

FIG. 1 is a schematic diagram illustrating a conventional alignment process. FIGS. 2A and 2B are enlarged schematic diagrams illustrating two regions shown in FIG. 1. Referring to FIG. 1, a linearly polarized light 120 with different direction irradiates the alignment layer 110 through a photomask 130 for making an alignment layer 110 have different alignment directions at different locations. Further, a substrate 140 or a light source is moved so that each region of the alignment layer 110 is irradiated by the linearly polarized light 120 to have a specific alignment direction. Generally, the photomask 130 is merely supported by a machine on the periphery so as to maintain a distance from the substrate 140. With an increase in dimensions of the substrate 140 and a demand for reducing process time, dimensions of the photomask 130 increase gradually, which may cause bent of the photomask 130 due to gravity. In addition, material of the photomask is flexible, so that distances from various locations of the photomask 130 to the alignment layer 110 are different. When incident angles of the linearly polarized light 120 are the same, a distance between an outlying area of the photomask 130 and the alignment layer 110 as shown in FIG. 2B is longer, and a distance between a center area of the photomask 130 and the alignment layer 110 as depicted in FIG. 2A is shorter. Accordingly, incident lights would generate slant incident angles relative to the substrate or the photomask respectively in photo alignment techniques. The slant incident angle is affected by the bent photomask, such that a projection of the slant incident light on the substrate has a displacement error. When the center area in the photomask 130 and the alignment layer 110 are precisely aligned, the outlying area in the photomask 130 and the alignment layer 110 have an alignment error therebetween, such that the alignment layer 110 can not be aligned satisfactorily.

FIG. 3A illustrates a relationship between a linearly polarized light and an alignment layer in a conventional photo alignment process. Referring to FIG. 3A, a slant incident angle between the linearly polarized light 120 and the normal vector of the alignment layer 110 is formed for generating a pre-tilted angle of the liquid crystal molecules induced by the alignment layer 110 in the conventional photo alignment technique. A wave vector 122 of the linearly polarized light 120, a polarization direction 124 of the linearly polarized light 120, and a normal vector 112 of the alignment layer 110 are co-planar. Under this condition, an alignment direction 114 of the alignment layer 110 is co-planar with the wave vector 122, the polarization direction 124, and the normal vector 112. The alignment direction of the alignment layer 110 is parallel to an orthographic projection of the polarization direction 124 on the alignment layer 110. Therefore, the wave vector 122 of the linearly polarized light 120, that is, the incident direction of the linearly polarized light 120, has to be adjusted in order to adjust the alignment direction 114 of the alignment layer 110. Hence, a relative position between a light source device (not shown) providing the linearly polarized light 120 and the substrate has to be adjusted many times for generating different alignment directions of the alignment layer 110, these adjustments increase the time cost of the photo alignment process and the occurrence of processing errors.

FIG. 3B is a schematic diagram showing the photomask adopted in the alignment process and the light incident direction in FIG. 1. Referring to FIG. 3B, the photomask 130 has a plurality of light transmissive regions 132 and the light transmissive regions are independent and not connected to one another. After passing the linearly polarized light through transmissive region 132 in a direction shown by an arrow, the linearly polarized light 120 ideally irradiates on a location framed by a dotted frame 152. However, when the photomask 130 bends so as to cause a distance between the photomask 130 and the substrate to change, a displacement error then results when the linearly polarized light 120 passes through the light transmissive region 132, and the linearly polarized light 120 irradiates a location framed by a dotted frame 154 instead of the dotted frame 152. The location of the dotted frame 154 includes offsets in both the X-axis and the Y axis comparing to the location of the dotted frame 152. When two adjacent regions in a pixel have different alignment directions, the displacement offsets resulting from the bending of the photomask 130 then cause the two adjacent regions with different alignment directions to overlap and thus affect the alignment. For example, the location of the dotted frame 154 is a region irradiated by the linearly polarized light 120 after passing through the light transmissive region 132. A location of the dotted frame 156 is a region irradiated by the linearly polarized light 120 after passing through the light transmissive region 132, where the light transmissive region 132 has moved to a bottom left region from current location due to the location offsets. As shown in FIG. 3B, the dotted frame 154 and the dotted frame 156 are partially overlapped such that the alignment direction of the overlapped part in the alignment layer is not definite. Under other conditions, a part of the alignment layer may not be irradiated by the linearly polarized light 120 and thus does not have a alignment direction.

Restricted by costs and technologies, the size of the photomask 130 does not equal to the size of the substrate 140 (denoted in FIG. 1). The photomask 130 has to be aligned with the substrate and be irradiated by the linearly polarized light 120 many times to complete the entire alignment process, resulting in high processing cost and low yield rate. To improve the above problems, a scanning alignment method has been developed. The light incident direction and the scanning direction are the same, thus the alignment direction which is parallel to the scanning direction is identical, which would reduce the projection offset effect caused by the bend of the photomask in the direction parallel to the scanning. However, the displacement error aforementioned still exists in this scanning method thus the scanning method is restricted to align the alignment layer in a direction parallel to the scanning direction. This method is currently used in wide viewing angle vertical photo alignment technology such as the mass production of inverse twisted nematic (ITN) products.

As for another wide viewing angle photo alignment technology, electrically controlled birefringence (ECB) has advantages such as faster liquid crystal responding speed and thus can have wide applications in liquid crystal displays. In a wide viewing angle ECB mode, the alignment directions of at least four directions are required in a pixel. Moreover, since the direction for aligning a top and a bottom substrates in the ECB mode have a 180° difference, irradiations from four different incident light directions are required respectively on the same sub-pixel for each substrate. Thus, the design of scanning alignment is not favorable in this case.

SUMMARY OF THE INVENTION

The invention is directed to a photo alignment process capable of aligning in a scanning manner and obtaining an alignment direction different from a scanning direction.

The invention is directed to a liquid crystal display capable of improving the poor picture quality caused by unfavorable alignment effect of an alignment layer.

The photo alignment process of the invention includes the following steps. A photo alignment material layer is formed on a substrate. The photo alignment material layer is irradiated by a linearly polarized light. A surface of the photo alignment material layer is a first plane. A wave vector of the linearly polarized light is a K vector. A second plane is constructed by a normal vector of the first plane and the K vector. A polarization direction of the linearly polarized light is neither perpendicular nor parallel to the second plane.

In one embodiment of the photo alignment process of the invention, an angle $\phi_f$ is formed between an orthographic projection of the polarization direction on the first plane and an absorption axis of a polarizer adhered to the substrate, wherein $\phi_f$ is substantially 45°, 135°, 225°, or 315°.

In one embodiment of the photo alignment process of the invention, an included angle of the K vector and the normal vector of the first plane is θ, and θ is 40°.

In one embodiment of the photo alignment process of the invention, the linearly polarized light irradiates the photo alignment material layer continuously. When the linearly polarized light irradiates the photo alignment layer continuously, an intersected point of the K vector and the first plane moves along a moving direction, and an orthographic projection of the K vector on the first plane overlaps with the moving direction. A method including moving the linearly polarized light with a fixed substrate or vice versa could make the intersected point move along the moving direction. The substrate is divided into a plurality of sub-pixel regions. Each of the sub-pixel regions includes at least one division. Each of the divisions is divided into a plurality of alignment regions along a direction perpendicular to the moving direction. The alignment direction of alignment regions along the moving direction is the same. The substrate is a rectangular substrate. Each of the sub-pixel regions is rectangular. Along a direction perpendicular to the moving direction, each division is divided into four alignment regions. Each sub-pixel region includes two divisions and each division is divided into four alignment regions along a direction perpendicular to the moving direction.

In one embodiment of the photo alignment process of the invention, the linearly polarized light irradiates the photo alignment material layer in a stepping method. The substrate is divided into a plurality of sub-pixel regions. Each of the sub-pixel regions includes at least one division. Each of the divisions is at least divided into four alignment regions by two demarcation lines intersecting each other. The substrate is a rectangular substrate. Each sub-pixel regions is rectangular. Each division is divided into four alignment regions by two demarcation lines perpendicular to each other. Each sub-pixel region includes two divisions and each division is at least divided into four alignment regions by two demarcation lines intersecting each other.

In one embodiment of the photo alignment process of the invention, the linearly polarized light irradiates the photo alignment material layer through a photomask.

In one embodiment of the photo alignment process of the invention, the linearly polarized light is ultraviolet light.

A liquid crystal display of the invention includes a first substrate, a second substrate, and a liquid crystal layer. There are a first electrode layer and a first alignment layer covering the first electrode layer on the first substrate. The first alignment layer is aligned with the photo alignment process aforementioned. There's a second electrode layer on the second substrate. The liquid crystal layer is disposed between the first alignment layer of the first substrate and the second electrode layer of the second substrate.

In one embodiment of the liquid crystal display of the invention, the second substrate further includes a second alignment layer covering the second electrode layer. The second alignment layer is aligned with the photo alignment process aforementioned. There is a 180° difference between an alignment direction of a region of the first alignment layer and an alignment direction of the corresponding region of the second alignment layer.

In one embodiment of the liquid crystal display of the invention, the first substrate is divided into a plurality of sub-pixel regions. Each of the sub-pixel regions includes at least one division. Each of the divisions is divided into a plurality of alignment regions along a side of the sub-pixel regions. The liquid crystal display further includes two polarizers adhering to the first substrate and the second substrate respectively. There is a 45° difference between at least one of the projection of the absorption axis of the polarizers and at least one of projection of the alignment direction of the liquid crystal in the alignment regions. The first substrate is a rectangular substrate. Each of the sub-pixel regions is rectangular. Boundaries of any two adjacent alignment regions of different sub-pixel regions are in a line. Each division is divided into four alignment regions along a side of the sub-pixel regions. Orientation angles of alignment directions of the four alignment regions in each of the divisions are 225°, 315°, 45°, and 135° in sequence. The first electrode layer has a plurality of slits and locations of the slits correspond to at least one of or all of the three boundaries that separate the four alignment regions in each of the sub-pixel regions. Orientation angles of alignment directions of the four alignment regions in each of the sub-pixel regions are sequentially 225°, 315°, 135°, and 45° or 225°, 135°, 315°, and 45°. The first electrode layer has a plurality of slits and locations of the slits correspond to at least one of or both of the two outer boundaries of the three boundaries that separate the four alignment regions in each of the sub-pixel regions. Orientation angles of alignment directions of the four alignment regions of each of the sub-pixel regions are 225°, 45°, 315°, and 135° in sequence. The first electrode layer has a plurality of slits, and locations of the slits correspond to a boundary located in the center of the three boundaries that separate the four alignment regions in each of the sub-pixel regions.

In one embodiment of the liquid crystal display of the invention, the first substrate is divided into a plurality of sub-pixel regions. Each sub-pixel region includes at least one division. Each division is divided into at least four alignment regions by two demarcation lines intersecting each other. Orientation angles of alignment directions of the four alignment regions of each of the sub-pixel regions are 225°, 135°, 45°, and 315° respectively in a clockwise direction. Each of the sub-pixel regions includes two divisions and each division is divided into at least four alignment regions by two demarcation lines intersecting each other.

In light of the foregoing, in the photo alignment process of the invention, the alignment direction of the photo alignment material layer can be adjusted by changing the polarization direction of the linearly polarized light instead of changing the wave vector of the linearly polarized light. Thus, the scanning method can be adopted in the process in a wide viewing angle ECB mode, the alignment error can be reduced, and the liquid crystal responding speed can be increased. As a consequence, the display quality of the liquid crystal display in the invention is improved.

In order to make the aforementioned and other features and advantages of the invention more comprehensible, several embodiments accompanied with figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 1 is a schematic diagram illustrating a conventional alignment process.

FIGS. 2A and 2B are enlarged schematic diagrams showing two regions in FIG. 1.

DESCRIPTION OF EMBODIMENTS

Figure 3A:
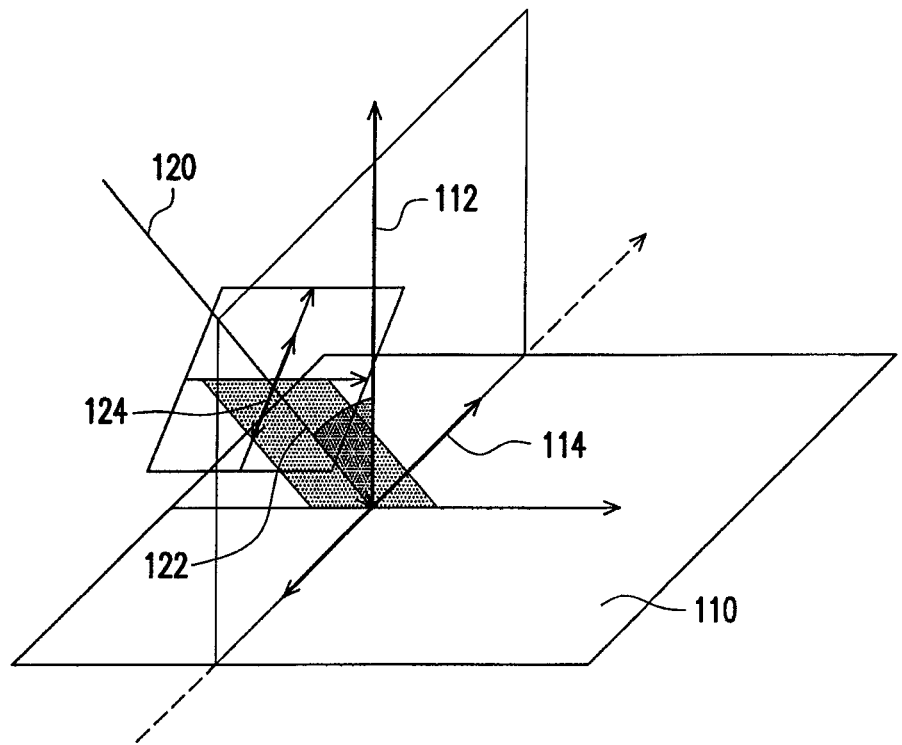
FIG. 3A illustrates a relationship between a linearly polarized light and an alignment layer in a conventional photo alignment process.
Figure 3B:
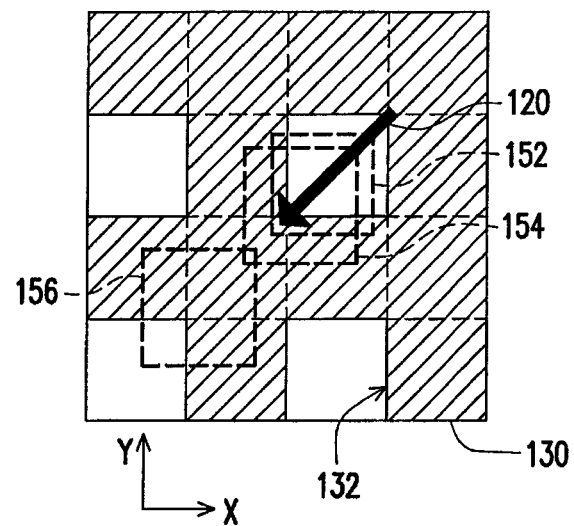
FIG. 3B is a schematic diagram showing the photomask adopted in the alignment process and the light incident direction in FIG. 1.
Figure 4:
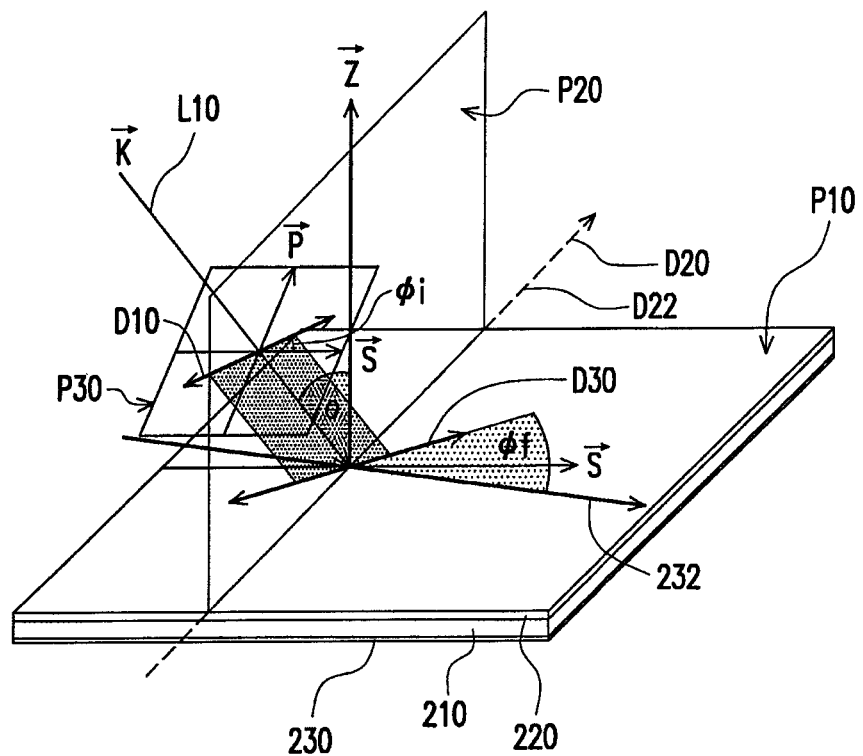
FIG. 4 illustrates a relationship between a linearly polarized light and a photo alignment material layer in a photo alignment process in an embodiment of the invention.

FIG. 4 illustrates a relationship between a linearly polarized light and a photo alignment material layer in a photo alignment process in an embodiment of the invention. Referring to FIG. 4, in a photo alignment process in the present embodiment, a photo alignment material layer 220 is formed on a substrate 210. A linearly polarized light L10 to induce alignment property then irradiates the photo alignment material layer 220. The photo alignment technique adopts the linearly polarized light for the alignment material to undergo polymerization, degradation, or sequential re-alignment of the molecular configuration in a specific direction, so that the arrangement of the alignment material changes from disordered to ordered. An alignment material having ordered molecular arrangement can induce liquid crystal molecules to align regularly. The linearly polarized light L10 could be ultraviolet light or other suitable light.

A surface of the photo alignment material layer 220 is defined as a first plane P10. A wave vector of the linearly polarized light L10 is a K vector which is used to represent a vector of a light transmission direction of the linearly polarized light L10. A second plane P20 is constructed by the K vector and a normal vector of the first plane P10 (denoted with Z vector in FIG. 4). A polarization direction D10 of the linearly polarized light L10 is neither perpendicular nor parallel to the second plane P20.

Figure 5:
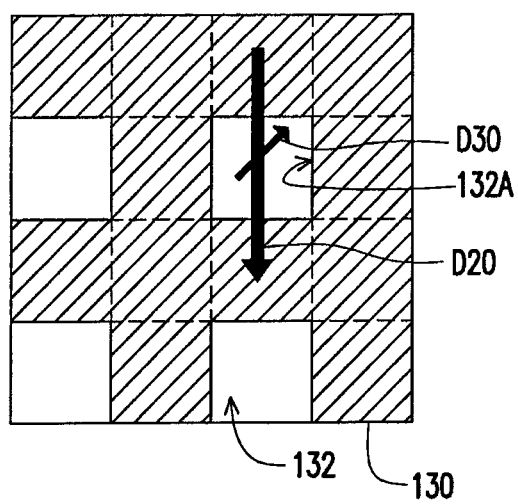
FIG. 5 depicts a relationship between a photomask and a linearly polarized light in an actual implementation of the photo alignment process in FIG. 4.

FIG. 5 depicts a relationship between a photomask and a linearly polarized light in an actual implementation of the photo alignment process in FIG. 4. Referring to FIGS. 4 and 5, the photomask 130 has a plurality of light transmissive regions 132 with a rectangular shape. Adopting the photo alignment process shown in FIG. 4, a projection of the K vector of the linearly polarized light L10 on the first plane P10 of the light alignment material layer 220 is depicted as a direction D20. The photo alignment material layer 220 generates an alignment direction D30 after being irradiated by the linearly polarized light L10. The alignment direction D30 can be changed by adjusting the polarization direction D10 of the linearly polarized light L10. In an embodiment, a favorable transmittance is obtained when the alignment direction D30 and an absorption axis 232 of a polarizer 230 adhered to the substrate 210 has an included angle of 45°. This included angle may not be precisely 45° due to processing errors. The polarizer 230 and the photo alignment material layer 220 are located at different layers on the substrate 210. At the same time, the projection direction D20 of the K vector of the linearly polarized light L10 is parallel to an edge 132A of the light transmissive region 132. Therefore, even though the photomask 130 is bent and alignment offsets occur in a direction perpendicular to the edge 132A, alignment offsets in a direction parallel to the edge 132A is reduced. That is, by utilizing the photo alignment process in the present embodiment, effects of the alignment offsets are limited to a single direction and thus easy to be compensated. Moreover, the alignment direction D30 can be adjusted by changing the polarization direction D10 of the linearly polarized light L10 without changing the projection direction D20 of the K vector of the linearly polarized light L10 so as to satisfy various design demands.

A relationship between the polarization direction D10 of the linearly polarized light L10 and the alignment direction D30 is illustrated in FIG. 4. A polarization pattern of the K vector includes components of a P vector and an S vector. The P vector is parallel to the second plane P20. The S vector is parallel to the first plane P10 and perpendicular to the second plane P20. The S vector, the P vector, and the polarization direction D10 are located on a third plane P30. The polarization direction D10 of the linearly polarized light L10 has to be perpendicular to the wave vector of the linearly polarized light L10 (that is, the K vector and, also, a moving direction of the linearly polarized light L10). An included angle of the polarization direction D10 and the S vector is $\phi_i$. Here, the included angle $\phi_i$ is defined as a rotation angle for rotating S vector to be in parallel to the polarization direction D10. An included angle of the K vector and the normal vector of the first plane P10 (that is, the Z vector) is $\theta$. The alignment direction D30 generated after the photo alignment material layer 220 is irradiated by the linearly polarized light L10 and the absorption axis 232 of the polarizer 230 adhered to the substrate 210 has an included angle of $\phi_f$. Herein, $\phi_f = \tan^{-1}(\tan \phi_i / \cos \theta)$. For example, $\phi_i$ is 37.5°, $\phi_f$ is 45°, and $\theta$ is 40°.

Referring to FIGS. 4 and 5, the projection direction D20 of the K vector of the linearly polarized light L10 is parallel to the edge 132A of the light transmissive region 132, so that the alignment offsets are limited to a single direction and easy to be compensated. For the photomask 130 in FIG. 5, as each of the light transmissive regions 132 is not connected, the photomask 130 and a light source providing the linearly polarized light L10 need to be moved to perform the photo alignment process to the other regions after the alignment of the photo alignment material layer 220 corresponding to the photomask 130 is complete. Obviously, the same effect can be attained by fixing the photomask 130 and the light source providing the linearly polarized light L10 and moving the substrate 210. The method of performing steps of moving and light irradiating alternately is referred as a stepping method.

Figure 6A:
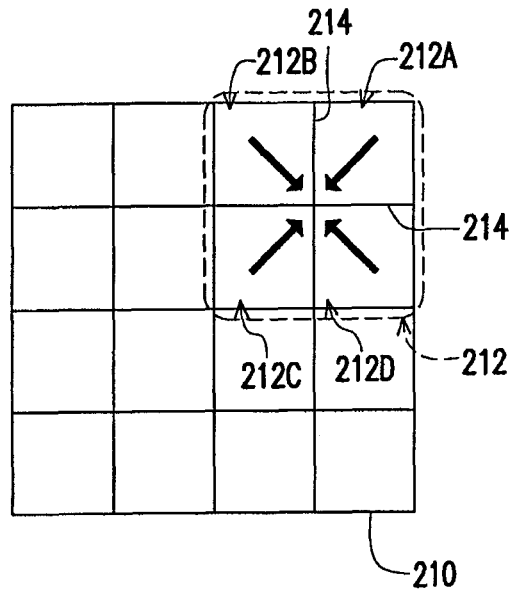
FIG. 6A is a schematic diagram of a substrate under the photomask in FIG. 5.
Figure 6B:
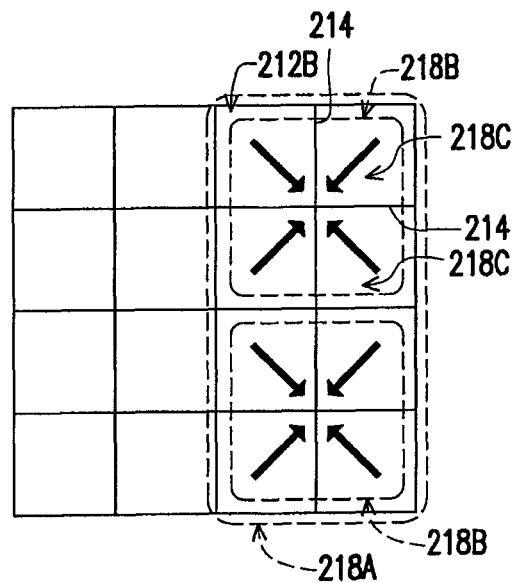
FIG. 6B illustrates a schematic diagram of a sub-pixel region in another embodiment of the invention.

FIG. 6A is a schematic diagram of a substrate under the photomask in FIG. 5. Referring to FIGS. 5 and 6A, the substrate 210 is divided into a plurality of sub-pixel regions 212. Each sub-pixel regions 212 is divided into four alignment regions 212A, 212B, 212C, and 212D by two demarcation lines 214 intersecting each other. In a clockwise direction, orientation angles of alignment directions of the alignment regions 212A, 212B, 212C, and 212D are, for example 225°, 135°, 45°, and 315° in sequence, but are not limited thereto. In an embodiment shown in FIG. 6B, each of a plurality of sub-pixel regions 218A has two divisions 218B. Each division 218B is divided into four alignment regions 218C by two demarcation lines 214 intersecting each other. An alignment direction of each of the alignment regions 218C is illustrated by an arrow. A method of dividing the sub-pixel region 218A into a plurality of divisions 218B can be applied to a low color shift design.

Figure 7A:
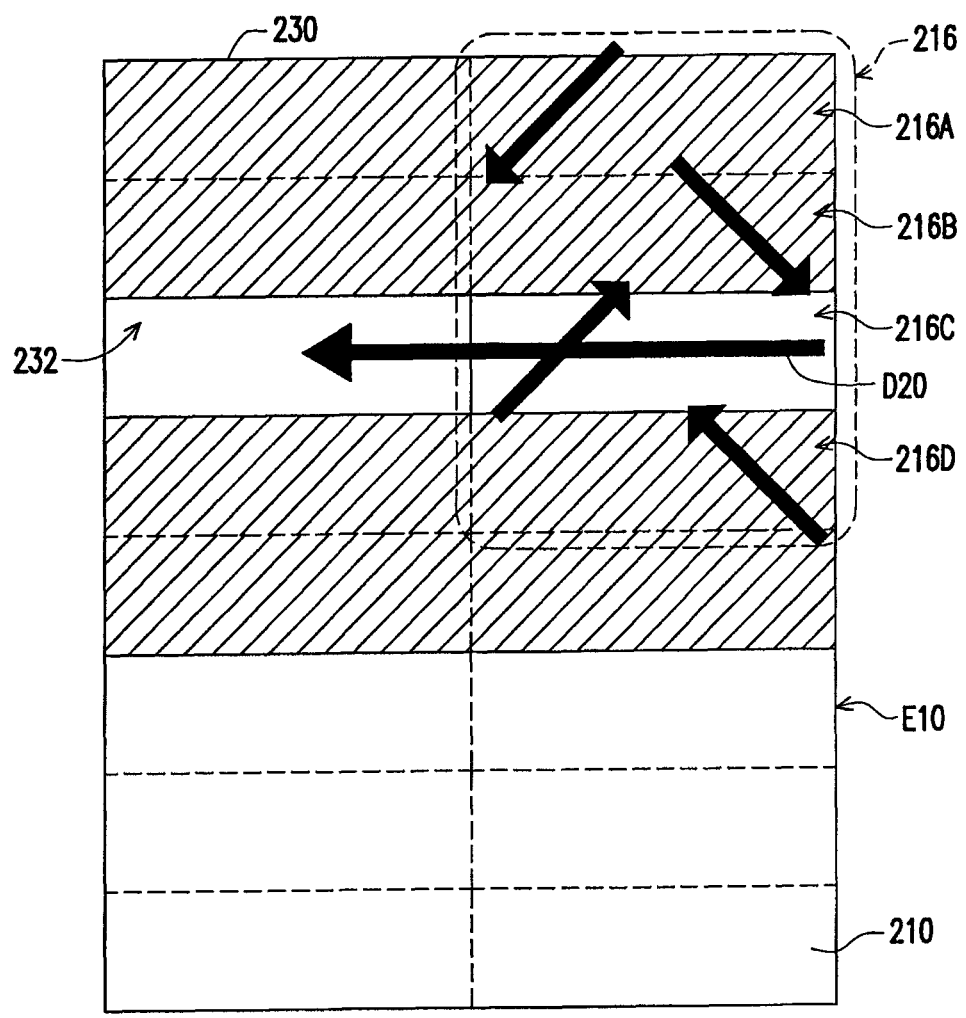
FIG. 7A illustrates a relationship between a photomask and a substrate in another embodiment of the invention.

FIG. 7A illustrates a relationship between a photomask and a substrate in another embodiment of the invention. Referring to FIGS. 4 and 7A, in the present embodiment, the linearly polarized light L10 irradiates the photo alignment material layer 220 continuously. When the linearly polarized light L10 irradiates the photo alignment material layer 220 continuously, an intersecting point Z10 of the K vector and the first plane P10 moves along a moving direction D22. The orthographic projection direction D20 of the K vector on the first plane P10 overlaps with the moving direction D22. In the present embodiment, each of a plurality of sub-pixel regions 216 of the substrate 210 is divided into four alignment regions 216A, 216B, 216C, and 216D along a direction perpendicular to the moving direction D22. A plurality of alignment regions arranged in a row along the moving direction D22 has the same alignment direction. In the present embodiment, each of the sub-pixel regions 216A, 216B, 216C, and 216D and boundaries perpendicular to the moving direction D22 are in line. Nevertheless, each of the sub-pixel regions 216A, 216B, 216C, and 216D and the boundaries perpendicular to the moving direction D22 may not in line as long as boundaries of any two adjacent alignment regions of different sub-pixel regions are in line. A plurality of light transmissive regions 232 of a photomask 230 is arranged into one or a plurality of alignment regions in a row along the moving direction D22. Since the alignment regions in the same row have the same alignment direction, when the light source providing the linearly polarized light L10 and the photomask 230 move along a moving direction D22, the linearly polarized light L10 could continuously aligns a plurality of alignment regions when passing them without adopting the stepping method with multiple alignment. Hence, the processing time and cost can be further saved. Also, as the orthographic projection of the K vector on the first plane P10 overlaps with the moving direction D22, the offset generated by the slant irradiation of the linearly polarized light L10 does not occur in the moving direction D22 and the problem of different alignment offsets in different regions along the moving direction D22 caused by the bending of the photomask 230 is alleviated.

Figure 7B:
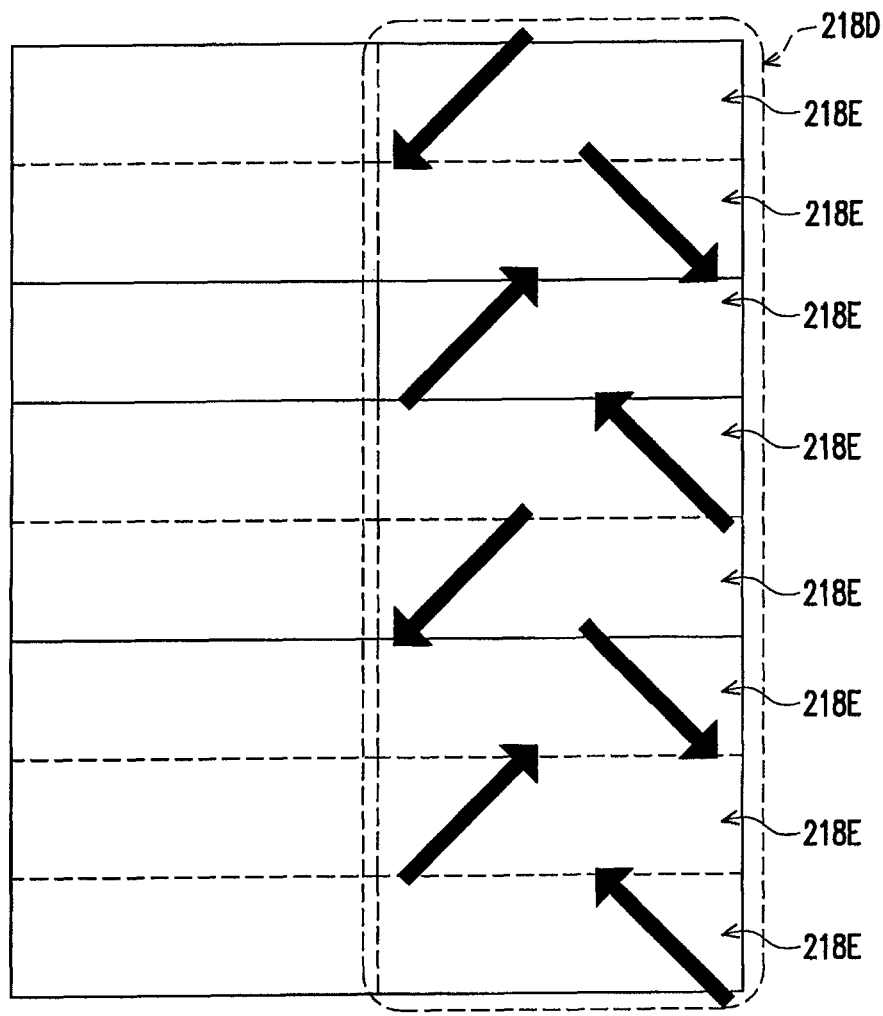
FIG. 7B illustrates a schematic diagram of a sub-pixel region in another embodiment of the invention.

In the embodiment shown in FIG. 7B, each of the sub-pixel regions 218D is divided into eight alignment regions 218E and an alignment direction of each of the alignment regions 218E is shown by an arrow. The alignment regions 218E can also be divided into a top and a bottom groups or more groups to be adopted in a low color shift design.

Figure 8:
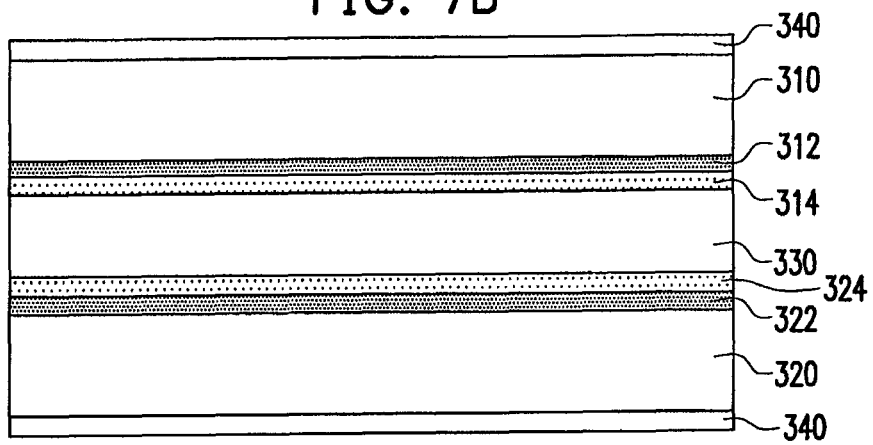
FIG. 8 is a cross-sectional diagram showing a liquid crystal display in an embodiment of the invention.

FIG. 8 is a cross-sectional diagram showing a liquid crystal display in an embodiment of the invention. Referring to FIG. 8, a liquid crystal display 300 in the present embodiment includes a substrate 310, a substrate 320, and a liquid crystal layer 330. The substrate 310 has an electrode layer 312 and an alignment layer 314 covering the electrode layer 312. The substrate 320 has an electrode layer 322 and an alignment layer 324 covering the electrode layer 322. The liquid crystal layer 330 is disposed between the alignment layer 314 of the substrate 310 and the alignment layer 324 of the substrate 320. There is a 180° difference between an alignment direction of a region of the alignment layer 314 and an alignment direction of the corresponding region of the alignment layer 324. The liquid crystal display 300 further includes two polarizers 340 adhered to a surface of the substrate 310 and that of the substrate 320 respectively. The alignment layers 314 and 324 can be aligned using the photo alignment process illustrated in the embodiments aforementioned or other processes. Thus, the alignment layers 314 and 324 of the present embodiment have superior processing yield rate and low processing cost, such that the display quality of the liquid crystal display 300 of the present embodiment can be improved and the cost thereof can be lowered.

Herein, the substrate 320 can be a color filter substrate, the electrode layer 322 can be a common electrode layer, the substrate 310 can be an active device array substrate, and the electrode layer 312 can be a pixel electrode layer. Alternatively, the above can also be fabricated with other suitable disposition methods. The substrate 320 could also include an alignment layer covering the electrode layer 322.

Figure 9:
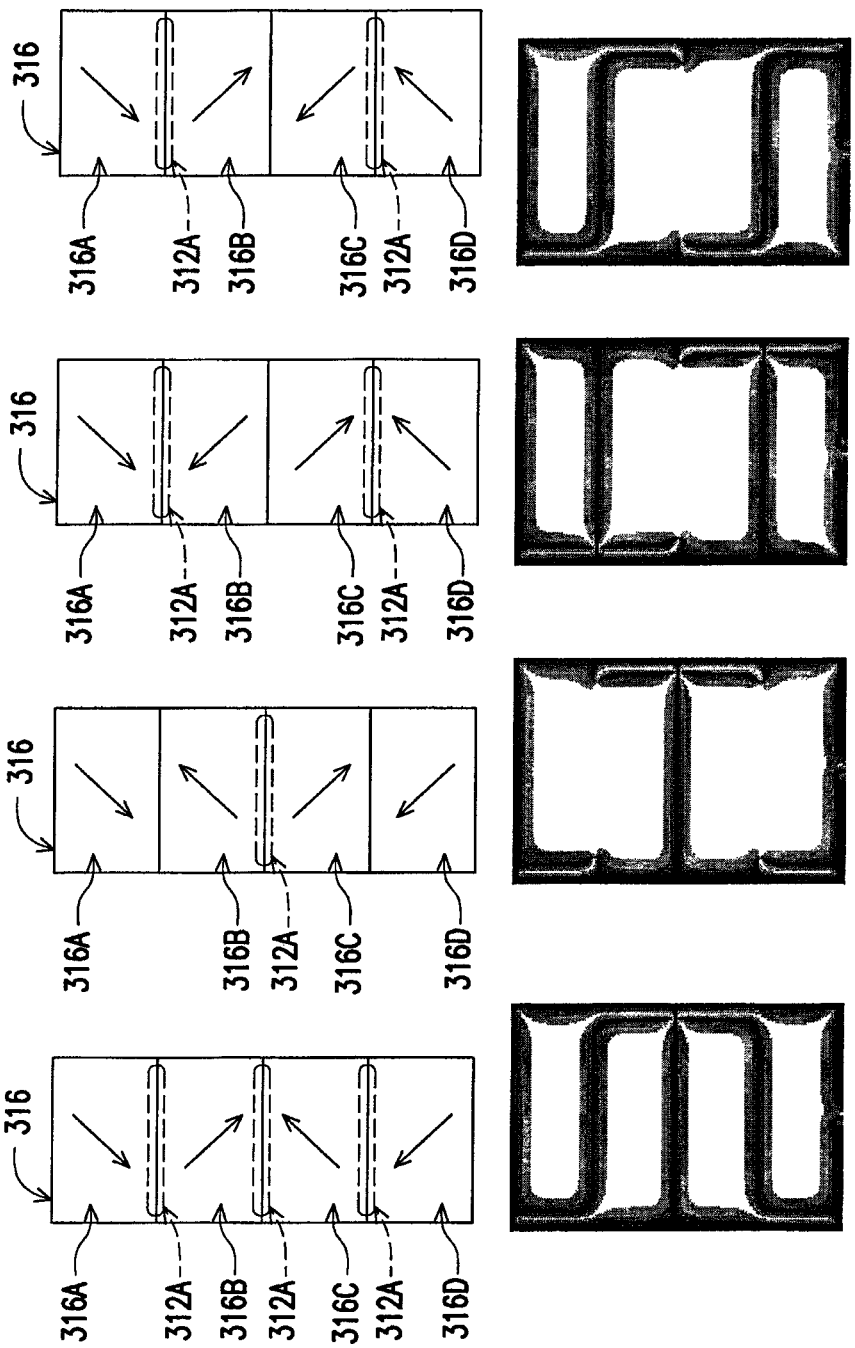
FIGS. 9A to 9D are schematic diagrams illustrating sub-pixel regions in four embodiments respectively.

FIGS. 9A to 9D are schematic diagrams illustrating sub-pixel regions in four embodiments respectively. Referring to FIG. 9A, similar to the sub-pixel regions 216 in FIG. 7, the substrate 310 in FIG. 8 is also divided into a plurality of sub-pixel regions 316. Here, only one sub-pixel region 316 is illustrated herein. Each of the sub-pixel regions 316 is divided into four alignment regions 316A, 316B, 316C, and 316D along a direction perpendicular to a moving direction of the linearly polarized light in the photo alignment process. As shown from an upper half portion of FIG. 9A, orientation angles of alignment directions of the four alignment regions 316A, 316B, 316C, and 316D are 225°, 315°, 45°, and 135° respectively. A light transmittance state obtained after a voltage is applied to the sub-pixel region 316 is simulated in this alignment method and is depicted in a lower half portion of FIG. 9A. At this time, a plurality of slits 312A is formed on the electrode layer 312. Positions of the slits 312A correspond to at least one of each three boundaries between the alignment regions 318A and 316B, 316B and 316C, 316C and 316D in each of the sub-pixel regions 316. Obviously, a plurality of slits can also be disposed on the electrode layer 322. Through a fringe field effect of the slits 312A, a speed of the liquid crystal alignment after a voltage is applied is increased therefore dark lines at the three boundaries between the alignments 316A and 316B, 316B and 316C, 316C and 316D could be decreased and result in enhanced brightness.

Figure 10:
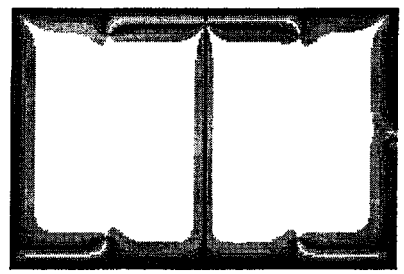
FIG. 10 shows a light transmittance obtained from a simulation after a plurality of slits is disposed in the sub-pixel region shown in FIG. 9B.

Referring to FIG. 9B, the orientation angles of the alignment directions of the four alignment regions 316A, 316B, 316C, and 316D are 225°, 45°, 315°, and 135° respectively. A light transmittance state obtained after a voltage is applied to the sub-pixel region 316 is simulated in this alignment method and is depicted in a lower half portion of FIG. 9B. Here, dark lines are only present at the boundary between the alignment regions 316B and 316C. At this time, the positions of the slits 312A correspond to the boundary between the alignment regions 316B and 316C. Through the fringe field effect of the slits 312A, the speed of the liquid crystal alignment after a voltage is applied is increased therefore dark lines on the boundary between the alignments 316B and 316C could be decreased and result in enhanced brightness as shown in FIG. 10. Referring to FIG. 9C, the orientation angles of the alignment directions of the four alignment regions 316A, 316B, 316C, and 316D are 225°, 135°, 315°, and 45° respectively. A light transmittance state obtained after a voltage of the sub-pixel region 316 is activated is simulated in this alignment method and is depicted in a lower half portion of FIG. 9C. Here, clear dark lines are present at the boundaries between the alignment regions 316B and 316C and between the alignment regions 316C and 316D. The positions of the slits 312A correspond to the boundary between the alignment regions 316A and 316B and the boundary between the alignment regions 316C and 316D. Through a fringe field effect of the slits 312A, a speed of the liquid crystal alignment after a voltage is applied is increased therefore dark lines on the boundaries between the alignments 316A and 316B and between 316C and 316D could be decreased and result in enhanced brightness.

Referring to FIG. 9D, the orientation angles of the alignment directions of the four alignment regions 316A, 316B, 316C, and 316D are 225°, 315°, 135°, and 45° respectively. A light transmittance state obtained after a voltage of the sub-pixel region 316 is activated is simulated in this alignment method and is depicted in a lower half portion of FIG. 9D. Here, clear dark lines are present at the boundaries between the alignment regions 316A and 316B and between the alignment regions 316C and 316D. The positions of the slits 312A correspond to the boundaries between the alignment regions 316A and 316B and the alignment regions 316C and 316D. Through a fringe field effect of the slits 312A, dark lines on the boundaries between the alignments 316A and 316B and between 316C and 316D are decreased and the brightness thereof is enhanced.

In summary, in the photo alignment process of the invention, the wave vector of the linearly polarized light and the projection of the polarization direction on the alignment material layer are neither perpendicular nor parallel to each other. Therefore, the light incident direction of the linearly polarized light could be adjusted to be parallel to the edges of the light transmissive regions of the photomask so as to control the direction of alignment offsets. Moreover, by adjusting the distribution of the alignment directions, the scanning process for continuously irradiating the linearly polarized light can be adopted so as to increase the processing speed and reduce alignment errors. Further, the alignment layer of the liquid crystal display of the invention adopts the photo alignment process aforementioned, such that the processing cost can be reduced and display quality can be improved.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A photo alignment process, comprising:
   forming a photo alignment material layer on a substrate, wherein a surface of the photo alignment material layer is a first plane; and
   irradiating the photo alignment material layer with a linearly polarized light, wherein a wave vector of the linearly polarized light is a K vector, a normal vector of the first plane and the K vector constructed a second plane, and a polarization direction of the linearly polarized light is neither perpendicular nor parallel to the second plane.

2. The photo alignment process as claimed in claim 1, wherein an orthographic projection of the polarization direction on the first plane and an absorption axis of a polarizer adhered to the substrate has an included angle of $\phi_f$, and $\phi_f$ is substantially 45°, 135°, 225°, or 315°.

3. The photo alignment process as claimed in claim 1, wherein an included angle of the K vector and the normal vector of the first plane is θ, and θ is 40°.

4. The photo alignment process as claimed in claim 1, wherein the linearly polarized light irradiates the photo alignment material layer continuously, when the linearly polarized light irradiates the photo alignment layer continuously, an intersected point of the K vector and the first plane moves along a moving direction, and an orthographic projection of the K vector on the first plane overlaps with the moving direction.

5. The photo alignment process as claimed in claim 4, wherein a method of the intersected point moving along the moving direction comprises fixing the substrate and moving the linearly polarized light.

6. The photo alignment process as claimed in claim 4, wherein a method of the intersected point moving along the moving direction comprises fixing the linearly polarized light and moving the substrate.

7. The photo alignment process as claimed in claim 4, wherein the substrate is divided into a plurality of sub-pixel regions, each of the sub-pixel regions comprises at least one division, each of the divisions is divided into a plurality of alignment regions along a direction perpendicular to the moving direction, and the alignment regions aligned in a row along the moving direction have a same alignment direction.

8. The photo alignment process as claimed in claim 7, wherein the substrate is a rectangular substrate.

9. The photo alignment process as claimed in claim 7, wherein each of the sub-pixel regions is rectangular.

10. The photo alignment process as claimed in claim 7, wherein each of the divisions is divided into four alignment regions along a direction perpendicular to the moving direction.

11. The photo alignment process as claimed in claim 7, wherein each of the sub-pixel regions comprises two divisions and each of the divisions is divided into four alignment regions along a direction perpendicular to the moving direction.

12. The photo alignment process as claimed in claim 1, wherein the linearly polarized light irradiates the photo alignment material layer in a stepping method.

13. The photo alignment process as claimed in claim 12, wherein the substrate is divided into a plurality of sub-pixel regions, each of the sub-pixel regions comprises at least one division, and each of the divisions is at least divided into four alignment regions by two demarcation lines intersecting each other.

14. The photo alignment process as claimed in claim 13, wherein the substrate is a rectangular substrate.

15. The photo alignment process as claimed in claim 13, wherein each of the sub-pixel regions is rectangular.

16. The photo alignment process as claimed in claim 13, wherein each of the divisions is divided into four alignment regions by two demarcation lines perpendicular to each other.

17. The photo alignment process as claimed in claim 13, wherein each of the sub-pixel regions comprises two divisions and each of the divisions is at least divided into four alignment regions by two demarcation lines intersecting each other.

18. The photo alignment process as claimed in claim 1, wherein the linearly polarized light irradiates the photo alignment material layer through a photomask.

19. The photo alignment process as claimed in claim 1, wherein the linearly polarized light is ultraviolet light.

20. A liquid crystal display, comprising:
a first substrate having a first electrode layer and a first alignment layer covering the first electrode layer, wherein the first alignment layer is aligned with the photo alignment process as claimed in claim 1;
a second substrate having a second electrode layer; and
a liquid crystal layer disposed between the first alignment layer of the first substrate and the second electrode layer of the second substrate.

21. The liquid crystal display as claimed in claim 20, wherein the second substrate further comprises a second alignment layer covering the second electrode layer, the second alignment layer is aligned by a photo alignment process comprising:
forming a photo alignment material layer on a substrate, wherein a surface of the photo alignment material layer is a first plane; and
irradiating the photo alignment material layer with a linearly polarized light, wherein a wave vector of the linearly polarized light is a K vector, a normal vector of the first plane and the K vector constructed a second plane, and a polarization direction of the linearly polarized light is neither perpendicular nor parallel to the second plane.

22. The liquid crystal display as claimed in claim 21, wherein an included angle of an alignment direction of a region of the first alignment layer and an alignment direction of a region of the second alignment layer corresponding to the region of the first alignment layer is 180°.

23. The liquid crystal display as claimed in claim 20, wherein the first substrate is divided into a plurality of sub-pixel regions, each of the sub-pixel regions comprises at least one division, each of the divisions is divided into a plurality of alignment regions along a side of the sub-pixel regions.

24. The liquid crystal display as claimed in claim 23, further comprising two polarizers adhering to the first substrate and the second substrate respectively, wherein an included angle of an absorption axis of at least one of the polarizers and the alignment direction of at least one of the alignment regions is 45°.

25. The liquid crystal display as claimed in claim 23, wherein the first substrate is a rectangular substrate.

26. The liquid crystal display as claimed in claim 23, wherein each of the sub-pixel regions is rectangular.

27. The liquid crystal display as claimed in claim 23, wherein boundaries of any two adjacent alignment regions of different sub-pixel regions are in line.

28. The liquid crystal display as claimed in claim 23, wherein each of the divisions is divided into four alignment regions along a side of the sub-pixel regions.

29. The liquid crystal display as claimed in claim 28, wherein orientation angles of alignment directions of the four alignment regions in each of the divisions are 225°, 315°, 45°, and 135° in sequence.

30. The liquid crystal display as claimed in claim 29, wherein the first electrode layer has a plurality of slits, and locations of the slits correspond to three boundaries of the four alignment regions in each of the divisions.

31. The liquid crystal display as claimed in claim 29, wherein the first electrode layer has a plurality of slits and locations of the slits correspond to at least one of three boundaries of the four alignment regions in each of the divisions.

32. The liquid crystal display as claimed in claim 28, wherein orientation angles of alignment directions of the four alignment regions in each of the divisions are sequentially 225°, 315°, 135°, and 45° or 225°, 135°, 315°, and 45°.

33. The liquid crystal display as claimed in claim 32, wherein the first electrode layer has a plurality of slits and locations of the slits correspond to two boundaries located on two sides of three boundaries of the four alignment regions in each of the divisions.

34. The liquid crystal display as claimed in claim 32, wherein the first electrode layer has a plurality of slits and locations of the slits correspond to at least one of two boundaries located on two sides of three boundaries of the four alignment regions in each of the divisions.

35. The liquid crystal display as claimed in claim 28, wherein orientation angles of alignment directions of the four alignment regions of each of the divisions are 225°, 45°, 315°, and 135° in sequence.

36. The liquid crystal display as claimed in claim 35, wherein the first electrode layer has a plurality of slits and locations of the slits correspond to a boundary located in a center of three boundaries of the four alignment regions in each of the divisions.

37. The liquid crystal display as claimed in claim 20, wherein the first substrate is divided into a plurality of sub-pixel regions, each of the sub-pixel regions comprises at least one division, and each of the divisions is at least divided into four alignment regions by two demarcation lines intersecting each other.

38. The liquid crystal display as claimed in claim 37, wherein orientation angles of alignment directions of the four alignment regions of each of the sub-pixel regions are 225°, 135°, 45°, and 315° in a clockwise direction.

39. The liquid crystal display as claimed in claim 37, wherein each of the sub-pixel regions comprises two divisions and each of the divisions is at least divided into four alignment regions by two demarcation lines intersecting each other.

* * * * *